United States Patent [19]

Sato et al.

[11] Patent Number: 4,560,716

[45] Date of Patent: Dec. 24, 1985

[54] RUST PREVENTING EPOXY RESIN COMPOSITIONS

[75] Inventors: Shigeyuki Sato, Toyota; Mitsumasa Matsushita, Nagoya, both of Japan

[73] Assignee: Kabushiki Kaisha Toyota Chuo Kenkyusho, Aichi, Japan

[21] Appl. No.: 643,921

[22] Filed: Aug. 24, 1984

[30] Foreign Application Priority Data

| | | | |
|---|---|---|---|
| Aug. 30, 1983 | [JP] | Japan | 58-158756 |
| Sep. 9, 1983 | [JP] | Japan | 58-167175 |
| Oct. 3, 1983 | [JP] | Japan | 58-185538 |
| Oct. 5, 1983 | [JP] | Japan | 58-186201 |
| Oct. 6, 1983 | [JP] | Japan | 58-188005 |
| Oct. 6, 1983 | [JP] | Japan | 58-188006 |
| Nov. 7, 1983 | [JP] | Japan | 58-208821 |
| Nov. 19, 1983 | [JP] | Japan | 58-218454 |
| Dec. 12, 1983 | [JP] | Japan | 58-234475 |
| Dec. 15, 1983 | [JP] | Japan | 58-236530 |
| Jul. 12, 1984 | [JP] | Japan | 59-145141 |
| Jul. 18, 1984 | [JP] | Japan | 59-149246 |
| Jul. 23, 1984 | [JP] | Japan | 59-152673 |
| Jul. 26, 1984 | [JP] | Japan | 59-156320 |
| Jul. 27, 1984 | [JP] | Japan | 59-158500 |

[51] Int. Cl.$^4$ .......................... C08K 5/39; C08K 5/49
[52] U.S. Cl. .................................. 523/451; 523/453; 523/456
[58] Field of Search ............... 523/451, 453, 456, 465, 523/457, 459, 460; 174/110 E

[56] References Cited

U.S. PATENT DOCUMENTS

| | | | |
|---|---|---|---|
| 3,242,130 | 3/1966 | Jackopin | 523/451 |
| 3,577,346 | 5/1971 | McKeown | 524/451 |
| 3,956,235 | 5/1976 | Pasternack et al. | 523/459 |
| 4,069,192 | 1/1978 | Monte | 523/451 |
| 4,100,089 | 7/1978 | Cammack | 523/451 |
| 4,100,327 | 7/1978 | Smith et al. | 523/453 |
| 4,198,310 | 4/1980 | Lyons et al. | 523/451 |

Primary Examiner—Veronica P. Hoke
Attorney, Agent, or Firm—Blum Kaplan Friedman Silberman & Beran

[57] ABSTRACT

Epoxy resin compositions including an epoxy resin, a hardener and an additive for forming a rust preventing film are provided. The additive is at least one selected from dithiophosphoric acids, dithiophosphoric acid derivatives, metal salts of dithiocarbamic acids and oxidized waxes. The composition may also include a secondary additive such as an organosilicon compound, an organoaluminum compound or an organotitanium compound for dithiophosphoric acid and/or dithiophosphoric acid derivative; an alkylarylsilsesquioxane silicone compound for a metal salt of dithiocarbamic acid; an alkylarylsilsesquioxane silicone compound, an organoaluminum compound, an organotitanium compound or an organotin compound for an oxidized wax. These epoxy resin compositions, when used as encapsulating materials, prevent moisture and impurities from penetrating into the surface of an encapsulated product because of the rust preventing film existing between the composition and the encapsulated product.

47 Claims, No Drawings

RUST PREVENTING EPOXY RESIN COMPOSITIONS

BACKGROUND OF THE INVENTION

This invention relates to epoxy resin compositions, and more particularly to epoxy resin compositions suitable for use as encapsulating materials for semiconductor devices and the like.

Generally, epoxy resins are cured using hardeners, such as amines, acid anhydrides, phenol resins, etc. to yield products having excellent electrical, mechanical and thermal properties. These properties make the epoxy resins suitable for use as encapsulating materials for protecting semiconductor devices and other electronic components from the environment or mechanical shocks. Plastic encapsulation using epoxy resins also presents productivity and economic advantages compared to encapsulating with ceramics or metals. For these reasons plastic encapsulation is used more frequently.

Recent advances in the art have resulted in semiconductor devices being more highly integrated. Accordingly, such highly integrated devices are being used in a greater variety of situations than heretofore. As the uses of such devices have increased, the need for reliability and maintenance of the electrical performance at high temperatures and high humidity has also increased. However, conventional epoxy resins possess fundamental problems under such conditions as will be described below. Accordingly, it has been difficult to provide an epoxy resin encapsulated device having the desired electrical characteristics at high temperature and high humidity.

Devices encapsulated with conventional epoxy resin compositions have low moisture resistance and corrosion resistance. This is attributable to the fact that the resin and the electrical device are in direct contact with each other and that the plastic encapsulation is not hermetic. Improvements have been extremely difficult. The epoxy resins absorb moisture and are permeable to moisture due to polar groups remaining in the cured products. Additionally, epoxy resins contain ionic impurities, such as chlorine derived from the epichlorohydrin used as a starting material, sodium derived from sodium hydroxide used for dechlorination, etc.

The ionic impurities are present in high concentration in the raw materials. Thus, interaction between the impurities and the moisture due to absorption or permeation results in a reduction in electrical performance. There is a reduction in the insulating properties of the plastic encapsulating the electrical parts which results in an increase in leakage current and the like. This may even cause corrosion of aluminum wiring and electrodes used in the devices which result in failure of the device.

At high temperatures the ionic impurities and other polar substances present in the resins become more mobile with an increase in activity due to thermal motion. When an electric field is generated in a portion of a device the ionic impurities become more active at the interface of the resin and the element. This lowers the electrical characteristics locally. If water is present corrosion rapidly proceeds and exerts an adverse effect.

In order to overcome these problems and maintain the electrical characteristics of a resin encapsulated device at high temperature and high humidity, various proposals have been made. For example, one such suggestion is to lower the reduction in the volume resistivity of the epoxy resin composition by the addition of an organosilicon compound. Such organosilicon compounds include, alkylarylsilsesquioxane silicone compounds having the chemical formula [A] described in Japanese Patent Application, Laid Open No. 81333/1981, as follows:

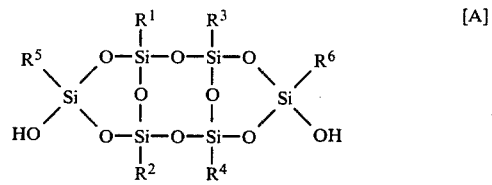

wherein $R^1$ to $R^6$, inclusive, are the same or different and each represents alkyl, aryl, alkenyl or aralkyl. Other organosilicon compounds suggested as additives include organosiloxane polymers having the general formula [B], described in Japanese Patent Publication Nos. 29720/1978 and 17536/1983, as follows:

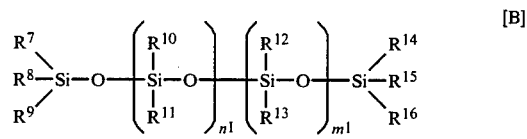

wherein $R^7$–$R^{16}$, inclusive, are the same or different and each represents alkyl, aryl, alkenyl, aralkyl, hydrogen or hydroxy, and $n^1$ and $m^1$ are independently 0 or an integer of 1 or more.

The electrical insulating property of resins including these additives are good at high temperatures and high humidity. However, the moisture resistance of resins including these organosilicon compound additives is not fully satisfactory. This is believed due to the ionic impurities present in the epoxy resins.

Finally, it has also been proposed to increase moisture resistance by reducing the ionic impurities present in the epoxy resin, or increasing the adhesion between the electrical elements and the resin. However, it remains difficult to remove the ionic impurities from the resin completely. This presents a problem of mold release and adhesion between the electrical part and the resin increases.

Accordingly, it is desirable to provide an epoxy resin composition particularly well suited for use as an encapsulating material for electrical elements, such as semiconductor devices which overcomes the problems associated with prior art compositions.

SUMMARY OF THE INVENTION

Generally speaking, in accordance with the invention, an improved epoxy resin composition particularly well suited for encapsulation of electrical devices is provided. The resin composition includes an epoxy resin, a hardener and a rust preventing film forming additive. The additive is at least one member selected from the group consisting of dithiophosphoric acids, dithiophosphoric acid derivatives, metal salts of dithiocarbamic acids and oxidized waxes. The composition may further include a secondary additive, such as an organosilicon compound, an organoaluminum compound, an organotitanium compound and an organotin compound. These epoxy resin compositions have excellent moisture resistance, rust preventing properties and provide good adhesion to electrical elements.

Accordingly, it is an object of the invention to provide an improved epoxy resin composition.

Another object of the invention is to provide an improved epoxy resin composition having improved moisture resistance and rust preventing properties.

A further object of the invention is to provide an epoxy resin composition containing a component for forming a rust preventing film for preventing the invasion of moisture or ionic impurities through the resin.

Still another object of the invention is to provide an improved epoxy resin composition particularly well suited for use as an encapsulating material for electrical component, for excluding rust and preventing rust from forming on the surfaces of electrical elements.

Still other objects and advantages of the invention will in part be obvious and will in part be apparent from the specification.

The invention accordingly comprises a composition of matter possessing the characteristics, properties, and the relation of components which will be exemplified in the composition hereinafter described, and the scope of the invention will be indicated in the claims.

DESCRIPTION OF THE PREFERRED EMBODIMENTS

The epoxy resin composition in accordance with the invention includes an epoxy resin component, a hardening agent and at least one rust preventing film forming component selected from the group of dithiophosphoric acids, dithophosphoric acid derviatives, metal salts of dithiocarbamaic acids and oxidized waxes. The composition may also include various secondary additives, such as an organosilicon compound, an organoaluminum compound, an organotitanium compound or an organotin compound.

The epoxy resin component suitable for use in the epoxy resin composition of the invention is not limited and may be a convenitonal one. Examples thereof include glycidyl ether epoxy resins, phenol novolak epoxy resins, cresol novolak epoxy resins, alicyclic epoxy resins, glycidyl ester epoxy resins, linear aliphatic epoxy resins, halogenated epoxy resins and the like. These epoxy resins may be used either alone, or as a mixture of two or more. The preferred epoxy resins are the phenol novolak epoxy resins and the cresol novolak epoxy resins in view of the electrical characteristics, heat resinstance, etc. These epoxy resins are subjected to curing by the use of hardeners to be described below.

The hardening agent suitable for use with the composition in accordance with the invention is also not limited. Examples of hardeners include acid anhydrides, such as phthalic anhydride, succinic anhydride, methylnadic anhydride, and the like, aromatic amines, such as methaphenylenediamine, diaminodiphenyl sulfone, aromatic amine adducts, and the like, aliphatic or alicyclic amines, such as polymethylenediamine, menthanediamine, and the like, prepolymers of synthetic resins, such as phenolic resins, cresol resins, and the like. These hardeners may be used either alone, or as a mixture of two or more. The preferred hardeners based on the improved electrical characteristics and heat resistance are the prepolymers of synthetic resins, such as the phenol resins, cresol resins etc.

The epoxy resin and the hardener are mixed in amounts so that the chemical equivalent ratio of the number of functional groups in the hardener to the number of epoxy groups in the epoxy resin is in the range of between about 0.5 to 1.5. This ratio is varied depending on the shelf life and curing characteristics, such as speed and the thermal and mechanical properties desired after curing. Preferably, the chemical equivalent ratio is in the range of 0.8 to 1.2 wherein improved curing characteristics may be obtained.

A curing accelerator may also be used in order to promote the speed of curing with the hardener. The particular curing accelerator used is not significant. Examples of curing accelerators include imidazoles, such as imidazole, 2-methylimidazole, 2-phenylimidazole, 2,4-dimethylimidazole, etc., amines, such as triethylamine, diethylaminopropylamine, N-aminoethylpiperazine, etc., complexes of triethylamine and the like and boron trifluoride ($BF_3$), and the like. These curing accelerators may be used either alone, or as a mixture of two or more. When a curing accelerator is used, the accelerator may be present in the range of about 0.05 to 5 parts by weight by 100 parts per weight of the epoxy resin.

The rust preventing film forming additive included in the epoxy resin composition in accordance with the invention is at least one member selected from the group consisting of dithiophosphoric acids, dithiophosphoric acid derivatives, metal salts of dithiocarbamic acids and oxidized waxes. The dithiophosphoic acids are compounds having the following chemical formula [C]:

wherein $R^{17}$ and $R^{18}$ are the same or different and each represents alkyl, aryl or alkenyl having 1 to 24 carbon atoms. Examples set forth for purposes of illustration, but not limitation, of dithiophosphoric acids, include diisopropyldithiophosphoric acid, di-s-butyldithiophosphoric acid, diisobutyldithiophosphric acid, diisoamyldithiophosphoric acid, and the like. When the dithiophosphoric-acids are utilized as a rust preventing film forming additive in accordance with the invention, a single acid may be used or a mixture of two or more acids may be utilized.

The dithiophosphoric acid derivatives utilized in accordance with the invention include both metal salts of dithiophosphoric acids and ammonium salts dithiophosphoric acids.

The metal salts of dithiophosphoric acids are those having the following chemical formula [D]:

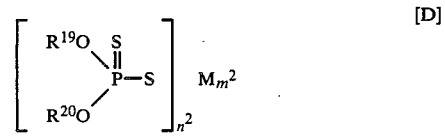

wherein $R^{19}$ and $R^{20}$ are the same or different and each represents alkyl, aryl or alkenyl having 1 to 24 carbon atoms, M represents a metallic element, such as zinc, molydbenum, iron, nickel, tin, silver and lead, $m^2$ and $n^2$ are each an integer. Without being limiting, specific examples of metal salts of dithiophosphoric acids, include zinc diisopropyldithiophosphate, zinc di-s-butyldithiophosphate, zinc diisobutyldithiophosphate, zinc diisoamyldithiophosphate, zinc diamyldithiophosphate, zinc di-4-methylpentyldithiophosphate, zinc di-2-ethylhexyldithiophosphate, zinc diisodecyldithiophosphate, zinc didodecylphenyldithiophosphate, zinc diphenyldithiophosphate, zinc dioctyldithiophosphate, molybdenum diisopropyldithiophosphate and the like. When a metal salt of dithiophosphoric acid is utilized in accordance with the invention, a single salt may be used or a mixture of two or more salts may be included.

The ammonium salts of dithiophosphoric acid are those having the following chemical formula [E]:

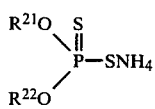

wherein $R^{21}$ and $R^{22}$ are the same or different and each represents alkyl, aryl or alkenyl having from 1 to 24 carbon atoms. Without being limiting, specific examples of ammonium salts of dithiophosphoric acid, include ammonium di-propyldithiophosphate, ammonium diisopropyldithiophosphate, ammonium dibutyldithiophosphate, ammonium diisobutyldithiosphosphate, ammonium di-s-butyldithiophospahte, ammonium diamyldithiophosphate, ammonium diisoamyldithiophosphate, ammonium di-4-methylpentyldithiophosphate, ammonium di-2-ethylhexyldithiophosphate, ammonium diisodecyldithiophosphate, ammonium dioctyldithiophosphate, ammonium didodecylphenyldithiophosphate, ammonium diphenyldithiophosphate and the like. When an ammonium salt of dithiophosphoric acid is included in the composition, a single salt may be used or a mixture of two or more may be included.

The dithiophosphoric acid and/or dithiophosphoric acid derivatives are preferably included in a composition in amounts between about 0.1–10 parts by weight per 100 parts by weight of the epoxy resin. If the additive concentration is less than 0.1 parts by weight, moisture resistance and rust prevention are not fully achieved. If the concentration exceeds about 10 parts by weight, the increase in results is small due to the additional material, and there is a possibility that other characteristics, such as adhesion and heat resistance are impaired. Most preferably, the dithiophosphoric acid and/or dithiophosphoric acid derivatives additives are included between about 0.5–5 parts by weight per 100 parts of the epoxy resin to provide excellent moisture resistance and rust preventing properties.

The metal salts of dithiocarbamic acid are salts having the following chemical formula [F]:

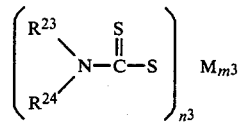

wherein $R^{23}$ and $R^{24}$ are the same or different and each represents alkyl, aryl, alkenyl or aralkyl having 1–18 carbon atoms. Alternatively, $R^{23}$ and $R^{24}$ may be coupled to form a ring and M represents a metallic element such as zinc, molybdenum, iron, nickel, copper, lead, tellurium and the like, $m^3$ and $n^3$ are each an integer. Without being limiting, specific examples of metal salts of dithiocarbamic acids, include zinc dimethyldithiocarbamate, zinc diethyldithiocarbamate, zinc dipropyldithiocarbamate, zinc dibutyldithiocarbamate, zinc diamyldithiocarbamate, zinc diisoamyldithiocarbamate, zinc dioctyldithiocarbamate, zinc di-2-ethylhexyldithiocarbamate, zinc N-ethyl-N-phenyldithiocarbamate, zinc N-pentamethylenedithiocarbamate, copper dimethyldithiocarbamate, copper diethyldithiocarbamate, copper N-pentamethylenedithiocarbamate, lead N-pentamethylenedithiocarbamate, ferric N-pentamethylene-dithiocarbamate and the like. When a metal salt of dithiocarbamic acid is included in the composition, a single salt may be used or a mixture of two or more may be included.

When the metal salt of dithiocarbamic acid is included in the composition, preferably between about 0.1–10 parts by weight per 100 parts by weight of the epoxy resin are included. If the salt concentration is less than 0.1 part, moisture resistance and rust prevention are not fully achieved. If the concentration exceeds 10 parts by weight, the increase in results is small due to the additional material, but there is a possibility that other characteristics, such as adhesion and heat resistance are impaired. Most preferably, the metal salts of dithiocarbamic acid are included between about 0.5–5 parts by weight per 10 parts of epoxy resin.

The oxidized waxes which may be utilized in accordance with the invention as a rust preventing film forming component are one or more of oxidized paraffin wax, metal salts and esterified derivatives thereof and oxidized natural wax. The oxidized paraffin wax is one having an improved rust preventing effect formed by oxidizing paraffin wax separated and purified from petroleum. There is no particular limitation on the purification method, degree of purification, saponification value, iodine value or melting point of the wax which may be used. While the acid value is not specifically limited, preferably the oxidized paraffin wax is one having an acid value of 10 or above to provide excellent characteristics.

Metal salts and esterified derivatives of the oxidized paraffin wax may also be used as an additive. Additionally, it is also possible to use the oxidized paraffin wax, or metal salts and esterified derivatives thereof which have been diluted with mineral oil and the like. The wax may also be contaminated with such impurities as isoparaffins, naphthenes, unsaturated waxes and the like. When a wax is utilized in accordance with the invention, a single wax may be used or a mixture of two or more may be included.

The oxidized natural wax that may be utilized in accordance with the invention is one having a rust preventing effect and is obtained by oxidizing natural wax derived from, for example, palm trees. There is no particular limitation on the type of wax by way of origin, purification method, degree of purification, saponification value or melting point. The acid value of the wax is not restricted; however, preferably, the wax has an acid value of 10 or above to provide excellent moisture resistance and rust preventing properties. When an oxidized natural wax is utilized in accordance with the invention, a single wax may be used or a mixture of two or more waxes may be included.

When an oxidized wax is included in a composition, preferably between about 0.1–10 parts by weight per 100 parts by weight of the epoxy resin are included. If less than 0.1 part is included, moisture resistance and rust prevention are not fully achieved. If the concentration of the wax exceeds 10 parts by weight, the increase in results is small due to the additional material, and there is the possibility that other characteristics, such as adhesion and heat resistance are reduced. Most preferably, the oxidized waxes are included in an amount between about 0.5–5 parts by weight per 100 parts of epoxy resin.

In addition to including a dithiophosphoric acid and/or dithiophosphoric acid derivative as a rust preventing film forming component in accordance with the invention, a combination of the dithiophosphoric acid and/or dithiophosphoric acid derivative component may be admixed with at least one or more secondary additives. The secondary additives are selected from an organosilicon compound, an organoaluminum compound and an organotitanium compound. Further, the metal salt of dithiocarbamic acid may be admixed with an alkylarylsilsesquioxane silicone compound as a secondary additive, or the oxidized waxes may be admixed with one secondary additive selected from alkylarylsilsesquioxane silicone compounds, organoaluminum compounds, an organotitanium compound and an organotin compound.

The organosilicon compound suitable as a secondary additive may be an alkylarylsilsesquioxane silicone compound having the general formula A, shown below, or an organosiloxane polymer of the general formula B, shown below as follows:

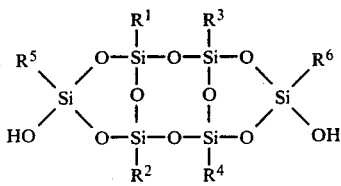
[A]

wherein $R^1$–$R^6$ are the same or different and each represents alkyl, aryl, alkenyl or aralkyl, and

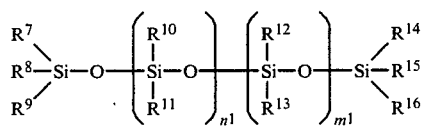
[B]

wherein $R^7$–$R^{16}$ are the same or different and each represents alkyl, aryl, alkenyl, aralkyl, hydrogen or hydroxy, and $n^1$ and $m^1$ are independently 0 or an integer of 1 or more.

The alkylarylsilsesquioxane silicone compound may be methylphenylpolysilsesquioxane having a hydroxyl group equivalent of 400 and a molecular weight of 1,600 wherein $R^1$–$R^6$ are methyl groups and phenyl groups. In the compositions in accordance with the invention, if such an alkylarylsilsesquioxane secondary additive is used, one or a mixture of more than one may be used.

The organosiloxane polymers suitable for use in the compositions in accordance with the invention include polydimethylsilioxane, polymethylophenylsiloxane, polydiphenylsiloxane, polymethylhydrogensiloxane, polymethylpentylsiloxane, polydiphenylsiloxane, polymethylnonanesiloxane, copolymers thereof and the like. It is not necessary that the organosiloxane compound be a single molecular weight, but may be of a wide range of molecular weights varying from low to high. When such an organosiloxane compound is utilized in a composition in accordance with the invention, one or more than one polymer may be used.

When an organosilicon secondary additive is included in the epoxy resin compositions in accordance with the invention, it may be included in amounts from about 0.1–5 parts by weight per 100 parts by weight of the epoxy resin. If less than 0.1 parts by weight are present, the tendency to form the rust preventing film with enhanced electrical insulating properties is not entirely satisfactory. On the other hand, if the concentration exceeds about 5 parts by weight, further improvements due to the addition are not observed.

The organoaluminum compound suitable for use as a secondary additive is not limited, however, preferably a stable compound having good water repellency is utilized. Such organoaluminum compounds are, for example, trialkoxyaluminum compounds, aluminum chelate compounds, aluminum coupling agents, and the like. Specific examples of organoaluminum compounds include, aluminum isopropylate, aluminum butylate, aluminum s-butylate, aluminum tertbutylate, aluminum diisopropylate-s-butylate, aluminum isopropylate di-s-butylate, aluminum octylate, aluminum laurate, aluminum stearate, aluminum oxide isopropylate, aliuminum oxide octylate, aluminum oxide stearate, aluminum oxide stearate trimer, aluminum tris-ethylacetoacetate, aluminum isopropoxyethylacetoacetate, aluminum dibutoxyacetoacetate, aluminum di-butyoxymonoethylacetate, and the like. When an organoaluminum compound is included in the composition, one or more than one may be used.

The organoaluminum compound is added to the composition in a concentration between about 0.01–5 parts by weight per 100 parts by weight of the epoxy resin. When less than 0.01 part by weight is used, the moisture resistance and rust prevention is not readily achieved. If the concentration exceeds 5 parts by weight, the properties improve, but the other characteristics, such as adhesion, moldability and heat resistance are impaired.

The organotitanium compound which may be included as a secondary additive is not limited, but a stable compound having good water repellency is preferred. Suitable titanium compounds include tetraalkoxytitanium compounds, titanium acylate compounds, titanium chelate compounds, titanium coupling agents, etc. Specific examples of suitable titanium compounds are tetraisopropyl titanate, tetrabutyl titanate, tetra-2-ethylhexyl titanate, tetrastearyl titanate, isopropyl tristearyl titanate, tributyl stearyl titanate, butyl titanate dimer, polypropyl titanate, polybutyl titanate, polytributyl stearyl titanate, titanium acetylacetonate, titanium ethylacetoacetate, titanium octylene glycolate, dihydroxy-bis(lactate) titanium, tetraoctylene glycol titanium, dipropoxytitanium bis(lactate), polytitanium acetylacetonate, polyhydroxytitanium stearate, isopropyl tridodecylbenzenesulfonyl titanate, isopropyl tris(dioctylpyrophosphate)titanate, tetraisopropyl bis(dioctylphosphite)titanate, tetraoctyl bis(ditridecylphosphite)titanate, tetra(2,2-diallyloxymethyl-1-butyl)bis(ditridecylphosphite)titanate, bis(dioctylpyrophosphate)oxyacetotitanate, bis(dioctylpyrophosphate)ethylene titanate, etc. When an organotitanium compound is used, one or more than one may be included.

The organotitanium compound is included in the composition in an amount from about 0.01–5 parts by weight per 100 parts by weight of the epoxy resin. If less than 0.1 part by weight is included, the moisture resistance and rust prevention is not fully achieved. If the concentration exceeds 5 parts by weight, the improvements are maintained, but other characteristics, such as adhesion, moldability and heat resistance may be impaired.

The organotin compound which may be included in the composition as a secondary additive is not limited. However, the organotin compound is preferably a stable compound having good water repellency. It is possible to use organotin stabilizers which are common additives for polyvinyl chloride resins. Such organotin compounds include alkyltin compounds, alkyltin mercaptide compounds, alkalytin sulfide compounds, alkyltin unsubstituted carboxylate compounds, alkyltin maleate compounds, alkyltin fumarate compounds, alkyltin substituted carboxylate compounds, alkyl stannate compounds, alkyltin-inorganic acid salt compounds, bis(alkyltin) oxide compounds, alkylhydroxytin compounds, alkyl-alkoxy tin compounds, aryltin compounds, phenolate tin compounds, tin aromatic carboxylate compounds, tin side-chain carboxylate compounds, tin aliphatic carboxylate compounds, etc.

Specific examples of the organotin compounds include tetrabutyltin, dibutyltin dilauryl mercaptide, butyltin trisdodecyl mercaptide, dimethyltin sulfide, octyltin sulfide, tributyltin laurate, tributyltin oleate, dibutyltin dilaurate, dibutyltin distearate, dibutyltin laurate maleate, dioctyltin laurate maleate, tributyltin acetate, trimethyltin maleate, tributyltin maleate, tributyltin gluconate, dibutyltin oxide, bistributyltin oxide, tetraphenyltin, tributyltin butyl phenolate, tributyltin benzoate, triphenyltin benzoate, triphenyltin terephthalate, tributyltin cinnamate, etc. When used, one or more than one organotin compound may be included in the composition.

The amount of the organotin compound included in the composition is preferably between about 0.01–5 parts by weight per 100 parts by weight of the epoxy resin. If less than 0.01 part by weight is included, the moisture resistance and rust prevention is not fully achieved. If the concentration exceeds 5 parts by weight, the improvement is noted, but there is a possibility that other characteristics, such as adhesion and moldability, is reduced.

The rust preventing film forming components included in the epoxy resin composition in accordance with the invention provides the following benefits. When an epoxy resin composition including the component is used as a plastic encapsulating material for products, such as electrical parts, a portion of the component does not react with the epoxy resin or hardener and exudes from the resin after the component is encapsulated. The additive which migrates to the surface of the encapsulated electrical device forms a rust preventing film. The rust preventing film which forms on the surface has excellent moisture resistance and prevents ionic impurities from penetrating into the device, thereby protecting it. The organosilicon compounds additive also minimizes reduction in electrical insulating properties at high temperatures in addition to the rust preventing characteristic.

The resin compositions in accordance with the invention prevent moisture and ionic impurities from penetrating the surface of the resin. When used as an encapsulating material and migrating to the encapsulated device, the resin compositions provide excellent moisture resistance and rust preventing properties. By excluding atmospheric moisture and ionic impurities from reaching the surface of the electrical components, the compositions prevent a decrease in the insulation properties of the electrical elements. Additionally, this prevents a reduction in electrical performance and prevents an increase in leakage current and the like. In sum, the compositions in accordance with the invention are particularly well suited for encapsulation of electrical devices and extend the reliability of the encapsulated electrical elements.

Since the additives included in the compositions in accordance with the invention function as rust preventing film forming components, it is unnecessary to deposit a separate rust preventing film on the surface of an electrical component. Thus, additional processing steps commonly associated with fabrication of electrical devices may be eliminated.

The epoxy resin compositions in accordance with the invention include primarily (a) an epoxy resin, (b) a hardening agent and (c) the above-described rust preventing film forming component. The dimensional stability, thermal characteristics and workability may be further improved by adding an additional inorganic filler to the composition. Examples of the inorganic fillers which may be included, include zirconia, alumina, talc, clay, magnesia, molten silica, crystalline silica, calcium silicate, calcium carbonate, barium sulfate, glass fiber, milled fiber and the like. Of these additional inorganic fillers, molten silica a crystalline silica are the most preferred. When used, inorganic fillers are desireably added in amounts between 150–500 parts by weight per 100 parts by weight of the epoxy resin.

Additionally, the epoxy resin compositions in accordance with the invention may contain additional agents; for example, release agents, such as natural wax, synthetic wax, straight-chain fatty acid metal salts, acid amides, esters and mixtures thereof; flame retardants, such as chlorinated paraffin, brominated bisphenol A epoxy resins, brominated phenol novolak epoxy resins bromotoluene, hexabromobenzene, antimony trioxide, etc.; a surface treating agent, such as silane coupling agent, a titanium coupling agent and the like and colorants, such as carbon black, etc. when required by the application.

Generally, the epoxy resin compositions in accordance with the invention may be prepared by completely mixing the above-described raw materials, in a mixer, such as a Henschel mixer, melting and kneading the components in a kneading machine, such as a heat roll or a kneader, then cooling and grinding the composition.

The following Examples are set forth to illustrate the compositions in accordance with the invention and their method of preparation. The Examples are set forth as illustrative and are not intended in a limiting sense.

EXAMPLE 1

100 Parts by weight of an orthocresol novolak epoxy resin as the epoxy resin component of the composition was mixed with each of the metal salts of dithiophosphoric acid as the rust preventing film forming component of the composition as set forth in Table 1. The epoxy resin and metal salts of dithiophosphoric acid were mixed in the mixing ratios set forth in the Table. All numerical values set forth in this Table and the following Tables are in parts by weight.

The epoxy resin and metal salts of dithiophosphoric acid components of each sample was mixed with 50 parts by weight of phenol novolak as a hardener, 3 parts by weight of 2-phenylimidazoles as a curing accelerator, 350 parts by weight of molten silica as an inorganic filler, 2 parts by weight of epoxysilane as a surface treating agent and 2 parts by weight of carnauba wax as a release agent. The components were mixed and each sample was melted and kneaded on a heat roll at a temperature of 80°-90° C. for five minutes. Samples were permitted to cool immediately to harden and were ground. Each ground products was molded into tablets to prepare four different epoxy resin compositions in accordance with the invention, designated Samples Nos. 1–4 in Table 1.

For purposes of comparison, an epoxy resin composition designated Sample No. $C_1$ in Table 1 was prepared using the same components, amount and conditions for Samples Nos. 1–4, except that the metal salts of dithiophosphoric acids were omitted. The five epoxy resin compositions of Samples Nos. 1–4 and $C_1$ were used to encapsulate a sample electrical element, including aluminum wiring and electrodes in a transfer molding machine at 175° C. for three minutes which was then cured by further heating at 165° C. for eight hours In order to test the performance of the encapsulated samples, they were subjected to a pressure cooker test. This test included applying a bias of 12 V in saturated steam at 121° C. and a pressure of 2 atom. The average life of each sample was measured and the moisture resistance of the encapsulation was evaluated. The results of the test are set forth in Table 2. The average life referred to therein is the time in hours (based on an average of several sample tablets) until the aliuminum wiring or electrodes corroded and caused a break in electrical conductivity.

TABLE 1

| Sample No. | Invention | | | | Comparison |
|---|---|---|---|---|---|
| | 1 | 2 | 3 | 4 | $C_1$ |
| Rust Preventing Film-forming Component | | | | | |
| Zinc Aromatic Dithiophosphate | 2 | — | — | — | — |
| Zinc lower Aliphatic Dithiophosphate | — | 2 | — | — | — |
| Zinc Higher Aliphatic Dithiophosphate | — | — | 2 | — | — |
| Molybdenum Dialkyldithiophosphate | — | — | — | 2 | — |

TABLE 2

| Sample No. | Invention | | | | Comparison |
|---|---|---|---|---|---|
| | 1 | 2 | 3 | 4 | $C_1$ |
| Average Life (hr) | 450 | 300 | 370 | 300 | 90 |

EXAMPLE 2

Seventy-five parts by weight of an orthocresol novolak epoxy resin and 25 parts by weight of a bisphenol A epoxy resin as the epoxy resin component were mixed with each of the metal salts of dithiophosphoric acid as a rust preventing film forming component as set forth in Table 3. The components were mixed at the mixing ratios set forth in the Table with the same additives as in Example 1. The hardener and additional additives were added at the same mixing ratios and mixed in the same manner as in Example 1 to obtain four different epoxy resin compositions in accordance with the invention designated Sample Nos. 5–8. For purposes of comparison, a comparative epoxy resin composition containing no rust preventing film forming component was prepared in the same manner and designated No. $C_2$.

In Table 3, the zinc secondary lower dialkyldithiophosphate (A) is principally one wherein the number of carbon atoms in the alkyl group is more than 5, while the zinc secondary lower dialkyldithiophosphate (B) is principally one wherein the number of carbon atoms in the alkyl group is 5 or less. The zinc primary lower dialkyldithiophosphate is principally one wherein the number of carbon atoms in the alkyl gorup is 5 or less.

The above Samples Nos. 5–8 and $C_2$ were encapsulated onto electrical elements as in Example 1. The average life of each sample was measured in the pressure cooker test to evaluate the moisture resistance thereof. The results are set forth in Table 4.

As shown in Table 4, when epoxy resin compositions of this invention were used, even at high temperature and high humidity, the average life was improved substantially compared to the conventional comparative composition.

TABLE 3

| Sample No. | Invention | | | | Comparison |
|---|---|---|---|---|---|
| | 5 | 6 | 7 | 8 | $C_2$ |
| Rust Preventing Film Forming Component | | | | | |
| Zinc Secondary Lower Dialkyldithiophosphate (A) | 2 | — | — | — | — |
| Zinc Secondary Lower Dialkyldithiophosphate (B) | — | 2 | — | — | — |
| Zinc Di-n-Octyldithiophosphate | — | — | 2 | — | — |
| Zinc Primary Lower Dialkyldithiophosphate | — | — | — | 2 | — |

TABLE 4

| Sample No. | Invention | | | | Comparison |
|---|---|---|---|---|---|
| | 5 | 6 | 7 | 8 | $C_2$ |
| Average Life (Hr) | 350 | 300 | 420 | 350 | 110 |

EXAMPLE 3

Two different epoxy resin compositions in accordance with the invention (Samples Nos. 9 and 10 in Table 5) were prepared using the same components, amounts and conditions as those described in Example 1. The 100 parts by weight of the orthocresol novolak epoxy resin as the epoxy resin component was mixed with methylphenylpolysilsequioxane (Toray Silicone, SH 6018) as an alkylarylsilsesquioxane component. Zinc aromatic dithiophosphate or molybdenum dialkyldithiophosphate was used as a metal salt of dithiophosphoric acid for the rust preventing film forming component. The components were mixed at the mixing ratios set forth in Table 5.

For purposes of comparison, comparative epoxy resin compositions designated Samples Nos. $C_3$ and $C_4$ was prepared using the same components, amounts and conditions as above, except that the molybdenum dialkyldithiophosphate alone was used as the rust preventing film forming component or no such component was used.

The four epoxy resin compositions, Samples Nos. 9, 10, $C_3$ and $C_4$ were encapsulated onto electrical elements as in Example 1. The moisture resistance was evaluated by the pressure cooker test described in Example 1. The results are set forth in Table 6.

As shown in Table 6, when the epoxy resin compositions of this invention were used, even at high temperature and high humidity, the average life was improved substantially, compared to the comparative compositons. Thus, the resin compositions of this invention are extremely useful as plastic encapsulants for electrical parts.

TABLE 5

| Sample No. | Invention | | Comparison | |
|---|---|---|---|---|
| | 9 | 10 | $C_3$ | $C_4$ |
| Rust Preventing Film Forming Component | | | | |
| Methylphenylpolysilsesquioxane | 1 | 1 | — | — |
| Zinc Aromatic Dithiophosphate | 1 | — | — | — |
| Molybdenum Dialkyldithiophosphate | — | 1 | — | 1 |

TABLE 6

| Sample No. | Invention | | Comparison | |
|---|---|---|---|---|
| | 9 | 10 | $C_3$ | $C_4$ |
| Average Life (hr) | 520 | 400 | 90 | 250 |

EXAMPLE 4

Two different epoxy resin compositions in accordance with the invention (Samples Nos. 11 and 12) were prepared using the same components, amounts and conditions as those in Example 3, except that 1 part by weight of 2-dodecylimidazole was used as the curing accelerator. The components set forth in Table 7 were used at the mixing ratios set forth as the rust preventing film forming component. Comparative epoxy resin compositions (Samples Nos. $C_5$ and $C_6$) were prepared using the same components, amounts and conditions as above, except that the alkylarylsilsesquioxane silicone compound alone or zinc primary lower dithiophosphate alone was used as the rust preventing film forming component. The lower alkyl groups in the zinc primary lower alkyl dithiophosphate and zinc secondary lower alkyl dithiophosphate rust preventing film forming components in Table 7 were principally those having 5 carbon atoms or less.

Electrical elements were encapsulated using Samples Nos. 11, 12, $C_5$ and $C_6$ to evaluate the moisture resistance with pressure cooker test. The results are set forth in Table 8.

As shown in Table 8, when the epoxy resin compositions of this invention were used, even at high temperature and high humidity, the average life was extended substantially compared to the conventional comparative compositions.

TABLE 7

| Sample No. | Invention | | Comparison | |
|---|---|---|---|---|
| | 11 | 12 | $C_5$ | $C_6$ |
| Rust Preventing Film Forming Component | | | | |
| Methylphenylsilsesquioxane | 1 | 1 | 1 | — |
| Zinc Primary Lower Alkyl Dithiophosphate | 1 | — | — | 1 |
| Zinc Secondary Lower | — | 1 | — | — |

TABLE 7-continued

| Sample No. | Invention | Comparison |
|---|---|---|
| Alkyl Dithiophosphate | | |

TABLE 8

| Sample No. | Invention | | Comparison | |
|---|---|---|---|---|
| | 11 | 12 | $C_5$ | $C_6$ |
| Average Life (hr) | 410 | 450 | 200 | 280 |

EXAMPLE 5

Twelve different epoxy resin compositions of this invention (Samples Nos. 13-24 in Table 9) were prepared using the same components, amounts and conditions as in Example 1. In each case the 100 parts of orthocresol novolak epoxy resin as the epoxy resin component was mixed with the metal salts of dithiophosphoric acids and the organosiloxane polymers as the rust preventing film forming component at the mixing ratios set forth in Table 9.

For purposes of comparison, comparative epoxy resin compositions (Samples Nos. $C_7$ through $C_{14}$ in Table 9) were prepared using the same components, amounts and conditions as above, except that the metal salt of dithiophosphoric acid alone or the organosiloxane polymer alone was used as the rust preventing film forming components or no such component was used.

These twenty epoxy resin compositions, Samples Nos. 13-24 and $C_7$-$C_{14}$, were used to encapsulate electrical elements as in Example 1. The moisture resistance was evaluated by the pressure cooker test described in Example 1. The results are set forth in Table 10.

As shown in Table 10, when the epoxy resin compositions of this invention were used, even at high temperature and high humidity, the average life was extended substantially compared to the comparative compsotioins. Thus, the resin compositions of this invention are extremely useful as plastic encapsulants for electrical parts.

EXAMPLE 6

Three different epoxy resin compositions in accordance with the invention (Samples Nos. 25-27 Table 11) were prepared using the same components, amounts and conditions as in Example 1. The 100 parts by weight of the orthocresol novolak epoxy resin as the epoxy resin component was mixed with zinc primary lower diaklyl dithiophosphate or zinc aromatic dithiophosphate as the metal salt or dithiophosphoric acid, and aluminum stearate or aluminum oxide stearate trimer, as an organoaluminum compound for the rust preventing components at the mixing ratios set forth in Table 11.

For purposes of comparison, three comparative epoxy resin compositions (Samples Nos. $C_{15}$-$C_{17}$ Table 11) were prepared using the same components, amounts and conditions as above, except that the primary lower dialkyldithiophosphate alone or the aluminum stearate alone was used as the rust preventing component or no rust preventing component was used.

The six epoxy resin compositions Samples 25-27 and $C_{15}$-$C_{17}$ were each encapsulated onto electrical elements as in Example 1. The

TABLE 9

| | Rust Preventing Film Forming Component | Sample No. Invention | | | | | | | | | | | | Comparison | | | | | | | |
|---|---|---|---|---|---|---|---|---|---|---|---|---|---|---|---|---|---|---|---|---|---|
| | | 13 | 14 | 15 | 16 | 17 | 18 | 19 | 20 | 21 | 22 | 23 | 24 | $C_7$ | $C_8$ | $C_9$ | $C_{10}$ | $C_{11}$ | $C_{12}$ | $C_{13}$ | $C_{14}$ |
| Organosiloxane polymer | Polydimethylsiloxane | 1 | 1 | 1 | 1 | — | — | — | — | — | — | — | — | 1 | — | — | — | — | — | — | — |
| | Polymethylnonanesiloxane | — | — | — | — | 1 | 1 | 1 | 1 | — | — | — | — | — | 1 | — | — | — | — | — | — |
| | Polymethylphenylsiloxane | — | — | — | — | — | — | — | — | 1 | 1 | 1 | 1 | — | — | 1 | — | — | — | — | — |
| Metal Salts of Dithiophosphoric Acids | Zinc Aromatic Dithiophosphate | 2 | — | — | — | 2 | — | — | — | 2 | — | — | — | — | — | — | 2 | — | — | — | — |
| | Zinc Primary Lower Dialkyl Dithiophosphate | — | 2 | — | — | — | 2 | — | — | — | 2 | — | — | — | — | — | — | 2 | — | — | — |
| | Zinc Primary Higher Dialkyl Dithiophosphate | — | — | 2 | — | — | — | 2 | — | — | — | 2 | — | — | — | — | — | — | 2 | — | — |
| | Molybdenum Dialkyldithiophosphate | — | — | — | 2 | — | — | — | 2 | — | — | — | 2 | — | — | — | — | — | — | 2 | — |

TABLE 10

| | Sample No. | | | | | | | | | | | | | | | | | | | |
|---|---|---|---|---|---|---|---|---|---|---|---|---|---|---|---|---|---|---|---|---|
| | Invention | | | | | | | | | | | | Comparison | | | | | | | |
| | 13 | 14 | 15 | 16 | 17 | 18 | 19 | 20 | 21 | 22 | 23 | 24 | $C_7$ | $C_8$ | $C_9$ | $C_{10}$ | $C_{11}$ | $C_{12}$ | $C_{13}$ | $C_{14}$ |
| Average Life (hr) | 680 | 590 | 645 | 630 | 820 | 650 | 735 | 710 | 765 | 595 | 710 | 640 | 120 | 160 | 145 | 450 | 300 | 370 | 300 | 90 | moisture resistance was evaluted by the pressure cooker test. The results are set forth in table 12.

As shown in Table 12, when the epoxy resin compositons of this invention were used, even at high temperature and high humidity, the average life was extended markedly compared to the comparative compositions. Thus, the resin compositions of this invention are extremely useful as plastic encapsulants for electrical parts.

TABLE 11

| Sample No. | Invention | | | Comparison | | |
|---|---|---|---|---|---|---|
| Rust Preventing Film Forming Component | 25 | 26 | 27 | $C_{15}$ | $C_{16}$ | $C_{17}$ |
| Zinc Primary Lower Dialkyldithiophosphate | 1 | — | — | — | — | 1 |
| Zinc Aromatic dithiophosphate | — | 1 | 1 | — | — | — |
| Aluminum Stearate | 1 | 1 | — | — | 1 | — |
| Aluminum Oxide Stearate Trimer | — | — | 1 | — | — | — |

TABLE 12

| Sample No. | Invention | | | Comparison | | |
|---|---|---|---|---|---|---|
| | 25 | 26 | 27 | $C_{15}$ | $C_{16}$ | $C_{17}$ |
| Average Life (hr) | 500 | 575 | 610 | 90 | 90 | 300 |

EXAMPLE 7

Three different epoxy resin compositions of this invention (Samples Nos. 28–30 in Table 13) were prepared using the same components, amounts and conditions as in Example 1. The 100 parts by weight of the orthocresol novolak epoxy resin as the epoxy resin component was mixed with zinc primary lower dialkyl dithiophosphate or zinc aromaticdithiophosphate as the metal salt of dithiophosphoric acid component and isopropyl tristearyl titanate or tetraoctyl bis(ditridecylphosphate) titanate as an organotitanium compound secondary additive at the mixing ratios set forth in Table 13. For purposes of comparison, three comparative epoxy resin compositions (Samples Nos. $C_{18}$–$C_{20}$) were prepared using the same components, amounts and conditions as above, except that the zinc primary lower dialkyldithiophosphorate alone or the isopropyl tristearyl titanate alone was used as the rust preventing film forming component or no rust preventing film forming component was used.

The six resin compositions Samples Nos. 28-30 and $C_{18}$-$C_{20}$ were encapsulated with electrical elements as in Example 1. The moisture resitance was evaluated by the pressure cooker test described in Example 1. The results are set forth in Table 14. As shown by the Table, when the epoxy resin compositions of this invention were used, even at high temperature and high humidity, the average life was extended markedly compared to comparative compositions. Thus, the resin compositions of this invention are extremely useful as plastic encapsulants for electrical parts.

TABLE 13

| Sample No. | Invention | | | Comparison | | |
|---|---|---|---|---|---|---|
| Rust Preventing Film Forming Component | 28 | 29 | 30 | $C_{18}$ | $C_{19}$ | $C_{20}$ |
| Zinc Primary Lower Dialkyldithiophosphate | 1 | — | — | — | — | 1 |
| Zinc Aromatic Dithiophosphate | — | 1 | 1 | — | — | — |
| Isopropyl Tristearyl Titanate | 1 | 1 | — | — | 1 | — |
| Tetraoctyl Bis(Ditridecylphosphite) Titanate | — | — | 1 | — | — | — |

TABLE 14

| Sample No. | Invention | | | Comparison | | |
|---|---|---|---|---|---|---|
| | 28 | 29 | 30 | $C_{18}$ | $C_{19}$ | $C_{20}$ |
| Average Life (hr) | 490 | 600 | 620 | 90 | 100 | 300 |

EXAMPLE 8

Four different epoxy resin compositions of this invention (Samples Nos. 31–34 in Table 15) were prepared using the same components, amounts and conditions as in Example 1. The 100 parts of the orthocresol novolak epoxy resin as the epoxy resin component was mixed with each of the ammonium salts of dithiophosphoric acid as the rust preventing film forming component at the mixing ratios as set forth in Table 15.

For purposes of comparison, a comparative epoxy resin composition (Samples Nos. $C_{21}$ in Table 15) was prepared using the same components, amounts and conditions as above, except that the ammonium salt of dithiophosphoric acid rust preventing film forming component was not included.

The five epoxy resin compositions, Samples Nos. 31–34 and $C_{21}$, were each encapsulated onto electrical elements as in Example 1. The moisture resistance was evaluated by the pressure cooker test. The results are set forth in Table 16. As shown in Table 16, when the epoxy resin compositions of this invention were used, even at high temperature and high humidity, the average life was extended markedly compared to the comparative composition. Thus, the resin compositions of this invention are extremely useful as plastic encapsulants for electrical parts.

TABLE 15

| Sample No. | Invention | | | | Comparison |
|---|---|---|---|---|---|
| Rust Preventing Film Forming Component | 31 | 32 | 33 | 34 | $C_{21}$ |
| Ammonium Diisoamyl-dithiophosphate | 2 | — | — | — | — |
| Ammonium Di-2-ethylhexyl-dithiophosphate | — | 2 | — | — | — |
| Ammonium Di-n-octyl-dithiophosphate | — | — | 2 | — | — |
| Ammonium Didodecylphenyl-dithiophosphate | — | — | — | 2 | — |

TABLE 16

| Sample No. | Invention | | | | Comparison |
|---|---|---|---|---|---|
| | 31 | 32 | 33 | 43 | $C_{21}$ |
| Average Life (hr) | 290 | 350 | 330 | 400 | 90 |

EXAMPLE 9

Two different epoxy resin compositions in accordance with the invention (Samples Nos. 35 & 36 in Table 17) were prepared using the same components, amounts and conditions as those in Example 1. The 100 parts by weight of the orthocresol novolak epoxy resin as the epoxy resin component was mixed with an ammonium salt of dithiophosphoric acid and an organoaluminum compound or an organotitanium compound at the mixing ratios set forth in the Table 17 as the rust preventing film forming component.

For purposes of comparison, four comparative epoxy resin compositions designated Samples Nos. $C_{22}$–$C_{25}$ in Table 17 were prepared using the same components, amounts and conditions as above, except that the ammonium salt of dithiophosphoric acid alone, the organoaluminum compound alone or the organotitanium compound alone was used as the rust preventing film forming component or no rust preventing filmforming component was used.

The six epoxy resin compositions, Samples Nos. 36, 37 and $C_{22}$–$C_{25}$, were encapsulated onto electrical elements and the moisture resistance was evaluated by the pressure cooker test described in Example 1. The results are set forth in Table 18.

As shown in Table 18, when the epoxy resin compositions of this invention were used, even at high temperature and high humidity, the average life was extended substantially compared to the comparative compositions. Thus, the resin compositions of this invention are extremely useful as plastic encapsulated for electrical parts.

TABLE 17

| Sample No. | Invention | | Comparison | | | |
|---|---|---|---|---|---|---|
| Rust Preventing Filmforming Component | 35 | 36 | $C_{22}$ | $C_{23}$ | $C_{24}$ | $C_{25}$ |
| Ammonium Di-2-ethylhexyl-dithiophosphate | 1 | 1 | — | — | — | 1 |
| Aluminum Oxide Stearate Trimer | 1 | — | — | 1 | — | — |
| Tetraoctyl Bis(ditridecyl-phosphite) Titanate | — | 1 | — | — | 1 | — |

TABLE 18

| Sample No. | Invention | | Comparison | | | |
|---|---|---|---|---|---|---|
| | 35 | 36 | $C_{22}$ | $C_{23}$ | $C_{24}$ | $C_{25}$ |
| Average Life (hr) | 550 | 510 | 90 | 90 | 100 | 300 |

EXAMPLE 10

Four different epoxy resin compositions in accordance with the invention (Sample Nos. 37–40 in Table 19) were prepared using the same components, amounts and conditions as described in Example 1. The 100 parts by weight of the orthocresol novolak epoxy resin as the epoxy resin component was mixed with each of the dithiocarbamic acid metal salts set forth at the mixing ratios as set forth in Table 19 as the rust preventing filmforming component.

For purposes of comparison a comparative epoxy resin composition designated Sample No. $C_{26}$ in Table 19 was prepared using the same components, amounts and conditions as above, except that the dithiocarbamic acid metal salt as the rust preventing film forming component was omitted.

The five epoxy resin compositions, Samples Nos. 37–40 and $C_{26}$, were encapsulated onto electrical elements and the moisture resistance was evaluated by the pressure cooker test described in Example 1. The results are set forth in Table 20.

As shown in Table 20, when the epoxy resin compositions of this invention were used, even at high temperature and high humidity, the average life was improved substantially compared to the conventional comparative composition. Thus, the resin compositions of this invention are extremely useful as a plastic encapsulant for electrical parts.

TABLE 19

| Sample No. | Invention | | | | Comparison |
|---|---|---|---|---|---|
| Rust Preventing Film forming Component | 37 | 38 | 39 | 40 | $C_{26}$ |
| Zinc Di-n-butyl- | 1 | — | — | — | — |

TABLE 19-continued

| Sample No. | Invention | | | Comparison | |
|---|---|---|---|---|---|
| dithiocarbamate | | | | | |
| Zinc Di-2-ethylhexyl-dithiocarbamate | — | 1 | — | — | — |
| Zinc Diethylphenyl-dithiocarbamate | — | — | 1 | — | — |
| Copper Diethyl-dithiocarbamate | — | — | — | 1 | — |

TABLE 20

| Sample No. | Invention | | | | Comparison |
|---|---|---|---|---|---|
| | 37 | 38 | 39 | 40 | $C_{26}$ |
| Average Life (hr) | 200 | 250 | 250 | 150 | 90 |

EXAMPLE 11

Five different epoxy resin compositions in accordance with the invention (Sample Nos. 41–45 in Table 21) were prepared using the same components, amounts and conditions as described in Example 1. The 100 parts by weight of the orthocresol novolak epoxy resin as the epoxy resin component was mixed with each of the dithiocarbamic acid metal salts as the rust preventing film forming component and methylphenylpolysilsesquioxane (Toray Silicone, SH 6018) as an alkylarylsilsesquioxane silicone compound at the mixing ratios set forth in Table 21.

For purposes of comparison five comparative epoxy resin compositions designated Sample Nos. $C_{27}$–$C_{31}$ in Table 21 were prepared using the same components, amounts and conditions as above, except that the dithiocarbamic acid metal salt alone or the methylphenylpolysilsesquioxane alone was used as the rust preventing film forming component or the rust preventing film forming component was not included.

The ten epoxy resin compositions, Samples 41–45 and $C_{27}$ and $C_{31}$, were encapsulated onto electrical elements and the moisture resistance was evaluated by the pressure cooker test described in Example 1. The results are set forth in Table 22.

As shown in Table 22, when the epoxy resin compositions of this invention were used, even at high temperature and high humidity, the average life was improved remarkably, compared to the comparative compositions. Thus, the resin compositions of this invention are extremely useful as plastic encapsulants for electrical parts.

TABLE 21

| Sample No. | Invention | | | | | Comparison | | | | |
|---|---|---|---|---|---|---|---|---|---|---|
| Rust Preventing Film forming Component | 41 | 42 | 43 | 44 | 45 | $C_{27}$ | $C_{28}$ | $C_{29}$ | $C_{30}$ | $C_{31}$ |
| Zinc Di-n-butyl-dithiocarbamate | 1 | — | — | — | — | 1 | — | — | — | — |
| Zinc Di-2-ethylhexyl-dithiocarbamate | — | 1 | — | 1 | — | — | 1 | — | — | — |
| Zinc N—Ethyl-N—phenyl-dithiocarbamate | — | — | 1 | — | 1 | — | — | 1 | — | — |
| Methylphenylpolysilsesquioxane | 1 | 1 | 1 | 2 | 2 | — | — | — | 1 | — |

TABLE 22

| Sample No. | Invention | | | | | Comparison | | | | |
|---|---|---|---|---|---|---|---|---|---|---|
| | 41 | 42 | 43 | 44 | 45 | $C_{27}$ | $C_{28}$ | $C_{29}$ | $C_{30}$ | $C_{31}$ |
| Average Life (hr) | 300 | 360 | 370 | 400 | 410 | 200 | 250 | 250 | 95 | 90 |

EXAMPLE 12

Five different epoxy resin compositions in accordance with the invention (Sample Nos. 46–50 in Table 24) were prepared using the same components, amounts and conditions as in Example 1. The orthocresol novolak epoxy resin, either alone or with a bisphenol A epoxy resin was used. The epoxy resin component was mixed with each of the oxidized paraffin wax and ester thereof having the characteristics shown in Table 23 at the mixing ratios set forth in Table 24.

The rust preventing film forming components suitable for use in accordance with the invention shown in Table 23 are all oxidized paraffin waxes. Table 23 shows the name of the manufacturer (in brackets) of each wax and its trade name.

For purposes of comparison two comparative epoxy resin compositions (Sample Nos. $C_{32}$ and $C_{33}$) were prepared using the same components, amounts and conditions as above, except that the rust preventing film forming component, namely, the oxidized paraffin wax was omitted in $C_{32}$ and the unoxidized paraffin was added in $C_{33}$.

The seven epoxy resin compositions Samples 46–50, $C_{32}$ and $C_{33}$, were encapsulated onto electrical elements and the moisture resistance was evaluated by the pressure cooker test described in Example 1. The results are set forth in Table 25.

As shown in Table 25, when the epoxy resin compositions of this invention were used, even at high temperature and high humidity, the average life has been improved markedly compared to the conventional comparative compositions. Thus, the resin compositions of this invention are extremely useful as plastic encapsulants for electrical parts.

TABLE 23

| Rust Preventing Film forming Component | Melting Point (°C.) | Acid Value (mgKOH/g) | Saponification Value (mgKOH/g) | Hydroxyl Value (mgKOH/g) | Iodine Value | Remarks |
|---|---|---|---|---|---|---|
| LUVAX-0321 (Nippon Seiro) | 78 | 12 | 30 | 80 | — | m.w. ca. 800 |
| OX-2251 | 35 | 10 | 130 | — | — | Methyl ester |

TABLE 23-continued

| Rust Preventing Film forming Component | Melting Point (°C.) | Acid Value (mgKOH/g) | Saponification Value (mgKOH/g) | Hydroxyl Value (mgKOH/g) | Iodine Value | Remarks |
| --- | --- | --- | --- | --- | --- | --- |
| (Nippon Seiro) | | | | | | of oxidized wax |
| NPS-8070 (Nippon Seiro) | 44 | 72 | 180 | 30 | 25 | Oxidized product of n-paraffin |
| ALOX-1689 (ALOX Co.) | 46 | 16 | 75 | — | — | — |

TABLE 24

| Sample No. | | Invention | | | | | Comparison | |
| --- | --- | --- | --- | --- | --- | --- | --- | --- |
| | | 46 | 47 | 48 | 49 | 50 | $C_{32}$ | $C_{33}$ |
| Epoxy Resin | Orthocresol Novolok Epoxy Resin | 100 | 100 | 100 | 100 | 75 | 100 | 100 |
| | Bisphenol A Epoxy Resin | — | — | — | — | 25 | — | — |
| Rust Preventing Film forming Component | LUVAX-0321 (Nippon Seiro) | 2 | — | — | — | — | — | — |
| | OX-2251 (Nippon Seiro) | — | 2 | — | — | — | — | — |
| | NPS-8070 (Nippon Seiro) | — | — | 2 | — | 2 | — | — |
| | ALOX-1689 (ALOX Co.) | — | — | — | 2 | — | — | — |
| | Paraffin | — | — | — | — | — | — | 2 |

TABLE 25

| Sample No. | Invention | | | | | Comparison | |
| --- | --- | --- | --- | --- | --- | --- | --- |
| | 46 | 47 | 48 | 49 | 50 | $C_{32}$ | $C_{33}$ |
| Average Life (hr) | 180 | 195 | 160 | 210 | 155 | 90 | 90 |

EXAMPLE 13

Three different epoxy resin compositions in accordance with the invention (Sample Nos. 51-53 in Table 27) were prepared using the same components, amounts and conditions as in Example 1, except that 90 parts by weight of the orthocresol novolak epoxy resin and 10 parts by weight of a brominated novolak epoxy resin were used. The epoxy resin components were mixed with each of the oxidized paraffin waxes and esters thereof having characteristics as shown in Table 26 as the rust preventing film forming component and methylphenylpolysilsesquioxane (Toray Silicone, SH 6018) as the alkylarylsilsesquioxane silicone compound at the mixing ratios set forth in Table 27.

For purposes of comparison five comparative epoxy resin compositions (Sample Nos. $C_{34}$-$C_{38}$) were prepared using the same components, amounts and conditions as above, except that the oxidized paraffin wax or esters thereof alone, or the methylphenylpolysilsesquioxane alone was used as the rust preventing film forming component or no rust preventing film forming component was used.

The eight epoxy resin compositions, Samples 51-53 and $C_{34}$-$C_{38}$, were encapsulated onto electrical elements and the moisture resistance was evaluated by the pressure cooker test as in Example 1. The set forth are given in Table 28.

As shown in Table 28, when the epoxy resin compositions of this invention were used, even at high temperature and high humidity, the average life was improved substantially compared to the comparative compositions. Thus, the resin compositions of this invention are extremely useful as plastic encapsulants for electrical parts.

TABLE 26

| Rust Preventing Film Forming Component | Melting Point (°C.) | Acid Value (mg KOH/g) | Saponification Value (mg KOH/g) | Remarks |
| --- | --- | --- | --- | --- |
| ALOX-1689 (ALOX Co.) | 46 | 16 | 75 | — |
| OX-2251 (Nippon Seiro) | 35 | 10 | 130 | Methyl ester of oxidized wax |
| NPS-8070 (Nippon Seiro) | 44 | 72 | 180 | Oxidized product of normal-rich paraffin |

TABLE 27

| Sample No. | Invention | | | Comparison | | | | |
| --- | --- | --- | --- | --- | --- | --- | --- | --- |
| Rust Preventing Filmforming Component | 51 | 52 | 53 | $C_{34}$ | $C_{35}$ | $C_{36}$ | $C_{37}$ | $C_{38}$ |
| ALOX-1689 (ALOX Co.) | 4 | — | — | 4 | — | — | — | — |
| OX-2251 (Nippon Seiro) | — | 4 | — | — | 4 | — | — | — |
| NPS-8070 (Nippon Seiro) | — | — | 4 | — | — | 4 | — | — |
| Methylphenylpolysilsesquioxane | 1 | 1 | 1 | — | — | — | 1 | — |

TABLE 28

| Sample No. | Invention | | | Comparison | | | | |
| --- | --- | --- | --- | --- | --- | --- | --- | --- |
|  | 51 | 52 | 53 | $C_{34}$ | $C_{35}$ | $C_{36}$ | $C_{37}$ | $C_{38}$ |
| Average Life (hr) | 340 | 325 | 280 | 105 | 95 | 80 | 70 | 65 |

EXAMPLE 14

An epoxy resin composition in accordance with the invention (Sample No. 54 in Table 29) was prepared using the same components, amounts and conditions as those in Example 1. The 100 parts by weight of the orthocresol novolak epoxy resin was mixed with the oxidized paraffin wax ester and methylphenylpolysiloxane set forth in Table 29 as the rust preventing film forming component. The mixing ratio set forth in Table 29 was used together with 80 parts by weight of 4-methyltetrahydrophthalic anhydride as a hardener and 420 parts by weight of molten silica as an inorganic filler.

For purposes of comparison two comparative epoxy resin compositions (Sample No. $C_9$ and $C_{10}$) were prepared using the same components, amounts and conditions as above, except that the oxidized paraffin wax ester alone or the methylphenylpolysilsesquioxane alone was added as the rust preventing film forming component.

The three epoxy resin compositions were used to encapsulate electrical elements and the average life of each sample was measured by the pressure cooker test as in Example 1. The results are set forth in Table 30.

As shown in Table 30, when the epoxy resin composition of this invention was used, even at high temperature and high humidity, the average life was improved substantially compared to comparative compositions.

TABLE 29

| Sample No. | Invention | Comparison | |
| --- | --- | --- | --- |
| Rust Preventing Film Forming Component | 54 | $C_{39}$ | $C_{40}$ |
| ALOX-1689 (ALOX Co.) | 4 | 4 | — |
| Methylphenyl-polysilosesquioxane | — | — | 1 |

TABLE 30

| Sample No. | Invention | Comparison | |
| --- | --- | --- | --- |
|  | 54 | $C_{39}$ | $C_{40}$ |
| Average Life (hr) | 305 | 140 | 90 |

EXAMPLE 15

Three different epoxy resin compositions in accordance with the invention (Sample Nos. 55–57 in Table 32) were prepared using the same components, amounts and conditions as in Example 1. The orthocresol novolak epoxy resin, either alone or with a bisphenol A epoxy resin, was used as the epoxy resin component. It was mixed with oxidized carnauba wax (a) having characteristics shown in Table 31 as the rust preventing filmforming component at the mixing ratios set forth in Table 32.

For purposes of comparison, a comparative epoxy resin composition (Sample No. $C_{41}$) was prepared using the same components, amounts and conditions as Sample No. 55 and 56, except that the oxidized carnauba wax was omitted.

The four epoxy resin compositions were encapsulated onto electrical components and the moisture resistance was evaluated by the pressure cooker test described in Example 1. The results are set forth in Table 33.

As shown in Table 33, when the epoxy resin compositions of this invention were used, even at high temperature and high humidity, the average life was improved compared to the conventional comparative composition. Thus, the resin compositions of this invention are extremely useful as plastic encapsulants for electrical parts.

TABLE 31

| Rust Preventing Film Forming Component | Acid Value (mg KOH/g) | Saponification Value (mg KOH/g) | Iodine Value | Melting Point (°C.) |
| --- | --- | --- | --- | --- |
| Oxidized Carnuba Wax (a) | 11.0 | 77.2 | 11.5 | 80.0 |
| Oxidized Carnauba Wax (b) | 10.7 | 75.7 | 13.6 | 81.1 |

TABLE 32

| Sample No. | Invention | | | Comparison |
| --- | --- | --- | --- | --- |
|  | 55 | 56 | 57 | $C_{41}$ |
| Rust Preventing Film Forming Component |  |  |  |  |
| Orthocresol Novolak Epoxy Resin | 100 | 100 | 75 | 100 |
| Bisphenol A Epoxy Resin | — | — | 25 | — |
| Oxidized Carnuba Wax (a) | 1 | 2 | 2 | — |

TABLE 33

| Sample No. | Invention | | | Comparison |
| --- | --- | --- | --- | --- |
|  | 55 | 56 | 57 | $C_{41}$ |
| Average Life (hr) | 170 | 190 | 170 | 90 |

EXAMPLE 16

Two different epoxy resin compositions in accordance with the invention (Sample Nos. 58 and 59 in Table 34) were prepared using the same components, amounts and conditions as in Example 1. The 100 parts by weight of the orthocresol novolak epoxy resin was mixed with the oxidized carnauba wax (a) or (b) having characteristics shown in Table 31 as the rust preventing film forming component and 2 parts by weight of paraffin as the release agent at the mixing ratios set forth in Table 34.

For purposes of comparison a comparative epoxy resin composition (Sample No. $C_{42}$) was prepared using the same components, amounts and conditions as above, except that the oxidized carnauba wax was omitted.

The three epoxy resin compositions Samples 58, 59 and $C_{42}$ were encapsulated onto electrical elements and the average life of these encapsulated samples were measured by the pressure cooker test of Example 1 to evaluate moisture resistance. The results are set forth in Table 35.

As shown in Table 35, when the epoxy resin compositions of this invention were used, even at high temperature and high humidity, the average life was improved significantly compared to the conventional comparative composition.

TABLE 34

| Sample No. | Invention | | Comparison |
|---|---|---|---|
| Rust Preventing Film Forming Component | 58 | 59 | $C_{42}$ |
| Oxidized Carnauba Wax (a) | 2 | — | — |
| Oxidized Carnauba Wax (b) | — | 2 | — |

TABLE 35

| Sample No. | Invention | | Comparison |
|---|---|---|---|
|  | 58 | 59 | $C_{42}$ |
| Average Life (hr) | 160 | 140 | 70 |

EXAMPLE 17

An epoxy resin composition in accordance with the invention (Sample No. 60 in Table 36) was prepared using the same components, amounts and conditions as in Example 1, except that 90 parts by weight of the orthocresol novolak epoxy resin and 10 parts by weight of a brominated novolak epoxy resin were used. The epoxy resin component was mixed with an oxidized carnauba wax having a melting point of 81.1° C. and an acid value of 10.7 mgKOH/g methylphenylpolysilsesquioxane (Toray Silicone, SH 6018) as an alkylarylsilsesquioxane silicone compound and 2 parts by weight of paraffin as a release agent at the mixing ratio set forth in Table 36.

For purposes of comparison three comparative epoxy resin compositions designated Sample Nos. $C_{43}$–$C_{45}$ in Table 36 were prepared using the same components, amounts and conditions as above, except that the oxidized carnauba wax alone or the aforesaid methylphenylpolysilsesquioxane alone was used as the rust preventing film forming component or no rust preventing film forming component was used.

The four epoxy resin compositions, Samples 60 and $C_{43}$–$C_{45}$ were encapsulated onto electrical elements and the moisture resistance was evaluated by the pressure cooker test described in Example 1. The results are set forth in Table 37.

A shown in Table 37, when the epoxy resin composition of this invention was used, even at high temperature and high humidity, the average life was extended substantially compared to the comparative compositions. Thus, this resin composition of this invention is extremely useful as a plastic encapsulant for electrical parts.

TABLE 36

| Sample No. | Invention | Comparison | | |
|---|---|---|---|---|
| Rust Preventing Film Forming Component | 60 | $C_{43}$ | $C_{44}$ | $C_{45}$ |
| Oxidized Carnauba Wax | 4 | 4 | — | — |
| Methylphenylpolysilsesquiioxane | 1 | — | 1 | — |

TABLE 37

| Sample No. | Invention | Comparison | | |
|---|---|---|---|---|
|  | 60 | $C_{43}$ | $C_{44}$ | $C_{45}$ |
| Average Life (hr) | 360 | 180 | 70 | 65 |

EXAMPLE 18

An epoxy resin composition in accordance with the invention (Sample No. 61 in Table 38) was prepared using the same components, amounts and conditions as in Example 1. The 100 parts by weight of orthocresol novolak epoxy resin was mixed with 80 parts by weight of 4-methyltetrahydrophthalic anhydride as a hardener, 420 parts by weight of silica glass powder as an inorganic filler and the same oxidized carnauba wax and methylphenylpolysilsesquioxane used in Example 17 as the rust preventing film forming component. These were mixed at the mixing ratio set forth in Table 38.

For comparison two comparative epoxy resin compositions designated Sample Nos. $C_{46}$ and $C_{47}$ were prepared using the same components, amounts and conditions as above, except that the oxidized carnauba wax alone or the aforesaid methylphenylsilsesquioxane alone was added as the rust preventing film forming component.

The above three epoxy resin compositions were used to encapsulate model elements and the average life of these encapsulated samples was measured by the pressure cooker test of Example 1 to evaluate the moisture resistance. The results are set forth in Table 39.

As shown by Table 39, when the epoxy resin composition of this invention was used, even at high temperature and high humidity, the average life was extended substantially compared to the comparative compositions.

TABLE 38

| Sample No. | Invention | Comparison | |
|---|---|---|---|
| Rust Preventing Film Forming Component | 61 | $C_{46}$ | $C_{47}$ |
| Oxidized Carnauba Wax | 4 | 4 | — |
| Methylphenylpolysilsesquioxane | 1 | — | 1 |

TABLE 39

| Sample No. | Invention | Comparison | |
|---|---|---|---|
|  | 61 | $C_{46}$ | $C_{47}$ |
| Average Life (hr) | 310 | 140 | 95 |

EXAMPLE 19

Four different epoxy resin compositions in accordance with the invention (Sample No. 62-65 in Table 40) were prepared using the same components, amounts and conditions as in Example 1. The 100 parts by weight of the orthocresol novolak epoxy resin was mixed with oxidized paraffin wax having an acid value of 21, oxidized wax methyl ester having an acid value of 10, oxidized petrolatum calcium having an acid value of 4, aluminum stearate and aluminum oxide stearate trimer as the rust preventing film forming component at the mixing ratios set forth in Table 40.

For comparison three epoxy resin compositions designated Sample Nos. $C_{48}$–$C_{50}$ in Table 40 were prepared using the same components, amounts and conditions as above, except that the oxidized wax methyl ester alone or the aluminum stearate alone was used as the rust preventing film forming component, or the rust preventing film forming component was omitted.

The above seven epoxy resin compositions were used to plastic encapsulate electrical elements and the mositure resistance was evaluated by the pressure cooker test of Example 1. The results are set forth in Table 41.

As shown in Table 41, when the epoxy resin compositions of this invention were used, even at high temperature and high humidity, the average life was extended substantially compared to the comparative compositions. Thus, the resin compositions of the inventions are extremely useful as plastic encapsulants for electrical parts.

TABLE 40

| Sample No. | Invention | | | | Comparison | | |
|---|---|---|---|---|---|---|---|
| Rust Preventing Film Forming Components | 62 | 63 | 64 | 65 | $C_{48}$ | $C_{49}$ | $C_{50}$ |
| Oxidized Paraffin Wax | 1 | — | — | — | — | — | — |
| Oxidized Wax Methyl Ester | — | 1 | 1 | — | — | — | 1 |
| Oxidized Petrolatum Calcium | — | — | — | 1 | — | — | — |
| Aluminum Stearate | 1 | 1 | — | — | — | 1 | — |
| Aluminum Oxide Stearate Trimer | — | — | 1 | 1 | — | — | — |

TABLE 41

| Sample No. | Invention | | | | Comparison | | |
|---|---|---|---|---|---|---|---|
| | 62 | 63 | 64 | 65 | $C_{48}$ | $C_{49}$ | $C_{50}$ |
| Average Life (hr) | 400 | 495 | 520 | 450 | 90 | 90 | 195 |

EXAMPLE 20

Four different epoxy resin compositions in accordance with the invention (Sample Nos. 66–69 in Table 42) were prepared using the same components, amounts and conditions as in Example 1. The 100 parts by weight or the orthocresol novolak epoxy resin was mixed with oxidized paraffin wax having an acid value of 21, oxidized wax methyl ester having an acid value of 10, oxidized peterolatum calcium having an acid value of 4, isopropyl tristearyl titanate and tetraoctyl bis(di-tridecylphosphite) titanate as the rust preventing film forming component at the mixing ratios set forth in Table 42.

For comparison three comparative compositions designated Sample Nos. $C_{51}$–$C_{53}$ in Table 42 were prepared using the same components, amounts and conditions as above. The oxidized wax methyl ester alone or the isopropyl tristearyl titanate alone was used as the rust preventing film forming component or the rust preventing film forming component was not included.

The above seven epoxy resin compositions were used to plastic encapsulate electrical parts and the moisture resistance was evaluated by the pressure cooker test described in Example 1. The results are set forth in Table 43.

As shown in Table 43, when the epoxy resin compositions of this invention were used, even at high temperature and high humidity, the average life has been extended substantially compared to the comparative compositions. Thus, the resin compositions of this invention are extremely useful as plastic encapsulants for electrical parts.

TABLE 42

| Sample No. | Invention | | | | Comparison | | |
|---|---|---|---|---|---|---|---|
| Rust Preventing Film Forming Component | 66 | 67 | 68 | 69 | $C_{51}$ | $C_{52}$ | $C_{53}$ |
| Oxidized Paraffin Wax | 1 | — | — | — | — | — | — |
| Oxidized Wax Methyl Ester | — | 1 | 1 | — | — | — | 1 |
| Oxidized Petrolatum Calcium | — | — | — | 1 | — | — | — |
| Isopropyl Tristearyl Titanate | 1 | 1 | — | — | — | 1 | — |
| Tetraoctyl Bis(di-tridecylphosphite) Titanate | — | 1 | 1 | — | — | — | — |

TABLE 43

| Sample No. | Invention | | | | Comparison | | |
|---|---|---|---|---|---|---|---|
| | 66 | 67 | 68 | 69 | $C_{51}$ | $C_{52}$ | $C_{53}$ |
| Average Life (hr) | 420 | 500 | 510 | 470 | 90 | 100 | 195 |

EXAMPLE 21

Four different epoxy resin compositions in accordance with the invention (Sample Nos. 70–73 in Table 44) were prepared using the same components, amounts and conditions as in Example 1. The 100 parts by weight of the orthocresol novolak epoxy resin was mixed with oxidized paraffin wax having an acid value of 21, oxidized wax methyl ester having an acid value of 10, oxidized petrolatum calcium having an acid value of 4, tetrabutyltin and dioctyltin distearate as the rust preventing film forming component at the mixing ratios set forth in Table 44.

For comparison three comparative epoxy resin compositions designated Sample Nos. $C_{54}$–$C_{56}$ in Table 44 were prepared using the same components, amounts and conditions above. The oxidized paraffin wax alone or the tetrabutyltin alone was used as the rust preventing film forming component or the rust preventing film forming component was not contained.

The above seven epoxy resin compositions were used to plastic encapsulate electrical parts and the moisture resistance was evaluated by the pressure cooker test described in Example 1. The results are set forth in Table 45.

As shown in Table 45, when the epoxy resin compositions of this invention were used, even at high temperature and high humidity, the average life is extended substantially compared to the comparative compositions. Thus, the resin compsitions of this invention are extremely useful as plastic encapsulants for electrical parts.

TABLE 44

| Sample No. | Invention | | | | Comparison | | |
|---|---|---|---|---|---|---|---|
| Rust Preventing Film Forming Component | 70 | 71 | 72 | 73 | $C_{54}$ | $C_{55}$ | $C_{56}$ |
| Oxidized Paraffin Wax | 1 | — | — | — | — | 1 | — |
| Oxidized Wax Methyl Ester | — | 1 | 1 | — | — | — | — |
| Oxidized Petrolatum Calcium | — | — | — | 1 | — | — | — |
| Tetrabutylin | 1 | 1 | — | — | — | — | 1 |
| Dioctyltin distearate | — | — | 1 | 1 | — | — | — |

TABLE 45

| Sample No. | Invention | | | | Comparison | | |
|---|---|---|---|---|---|---|---|
| | 70 | 71 | 72 | 73 | $C_{54}$ | $C_{55}$ | $C_{56}$ |
| Average Life (hr) | 490 | 525 | 550 | 600 | 90 | 160 | 110 |

It will thus be seen that the objects set forth above, among those made apparent from the preceding description, are efficiently attained and, since certain changes may be made in the above compositions without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An epoxy resin composition, comprising an epoxy resin, a hardener and a least one additive for forming a rust preventing film selected from the group consisting of:

dithiophosphoric acids having the following chemical formula:

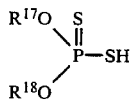

wherein $R^{17}$ and $R^{18}$ are the same or different and each represents alkyl, aryl or alkenyl having 1 to 24 carbon atoms, dithiophosphoric acid derivaties selected from the group consisting of metal salts of dithiophosphoric acids amd ammonium salts of dithiophosphoric acids, metal salts of dithiocarbamic acids having the following chemical formula:

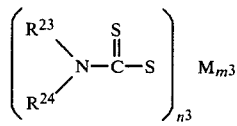

wherein $R^{23}$ and $R^{24}$ are the same or different and each represents alkyl, aryl, alkenyl or aralkyl having 1–18 carbon atoms, or $R^{23}$ and $R^{24}$ may be taken together to form a ring, M represents a metallic element selected from zinc, molybdenum, iron, nickel, copper, lead, tellurium, and $m^3$ and $n^3$ are each an integer, and oxidized waxes.

2. The epoxy resin composition of claim 1, wherein said metal salt of a dithiophosphoric acid is at least one member selected from compounds having the following chemical formula:

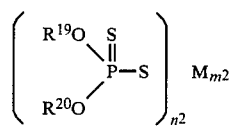

wherein $R^{19}$ and $R^{20}$ are the same or different and each represents alkyl, aryl or alkenyl of 1-24 carbon atoms, M represents a metallic element selected from the group of zinc, molybdenum, iron, nickel, tin, silver and lead and $m^2$ and $n^2$ are independently an integer.

3. The epoxy resin composition of claim 3, wherein said metal salt of a dithiophosphoric acid is at least one of zinc diisopropyldithiophosphate, zinc di-s-butyldithiophosphate, zinc diisobutyldithiophosphate, zinc diisoamyldithiophosphate, zinc di-amyldithiophosphate, zinc di-4-methylpentyldithiophosphate, zinc di-2-ethylhexyldithiophophate, zinc diisodecyldithiophosphate, zinc didoecylphenyldithiophosphate, zinc dipehnylditthiophosphate, zinc dioctyldithiophosphate and molybdenum diisopropyldithiophosphate.

4. The epoxy resin composition of claim 1, wherein said ammonium salt of a dithiophosphoric acid is at least one member selected from compounds of the following chemical formula:

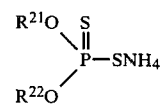

wherein $R^{21}$ and $R^{22}$ are the same or different and each represents alkyl, aryl or alkenyl.

5. The epoxy resin composition of claim 4, wherein said ammonium salt of a dithiophosphoric acids is at least one of ammonium dipropyldithiophosphate, ammonium diisopropyldithiophosphate, ammonium dibutyldithiophosphate, ammonium diisobutyldithiophosphate, ammonium di-s-butyldithiophosphate, ammonium diamyldithiophosphate, ammonium diisoamyldithiophosphate, ammonium di-4-methylpentyldithiophosphate, ammonium di-2-ethylhexyldithiophosphate, ammonium diisodecyldithiophosphate, ammonium dioctyldithiophosphate, ammonium didodecylphenyldithiophosphate and ammonium diphenyldithiophosphate.

6. The epoxy resin composition of claim 1, wherein said additive is at least one member selected from the group consisting of said dithiophosphoric acids and said dithiophosphoric acid derivaties.

7. The epoxy resin composition of claim 6, wherein said additive is present in an amount of about 0.1–10 parts by weight per 100 parts by weight of the epoxy resin.

8. The epoxy resin composition of claim 7, further including at least one secondary additive selected from the group of:

organosilicon compounds, selected from an alkylarylsilsesquioxane silicone compound having the chemical formula

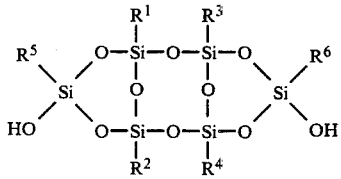

wherein $R^1$-$R^6$ are the same or different and each represents alkyl, aryl, alkenyl or aralkyl and an organosiloxane polymer, organoaluminum compounds selected from trialkoxyaluminum compounds, aluminum chelate compounds and aluminum coupling agents; and organotitanium compounds selected from tetraalkoxytitanium compounds, titanium acylate compounds, titanium chelate compounds and titanium coupling agents.

9. The epoxy resin composition of claim 7, further including at least one secondary additive selected from the group of:

organosilicon compounds, selected from an alkylarylsilsesquioxane silicone compound having the chemical formula

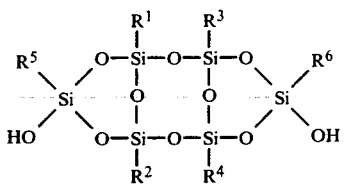

wherein $R^1$–$R^6$ are the same or different and each represents alkyl, aryl, alkenyl or aralkyl and an organosiloxane polymer, organoaluminum compounds selected from aluminum isopropylate, aluminum butylate, aluminum s-butylate, aluminum tert-butylate, aluminum diisopropylate s-butylate, aluminum isopropylate di-s-butylate, aluminum octylate, aluminum laurate, aluminum stearate, aluminum oxide isopropylate, aluminum oxide octylate, aluminum oxide stearate, aluminum oxide stearate trimer, aluminum trisethylacetoacetate, aluminum isopropoxyethylacetoacetate, aluminum dibutoxyacetoacetate and aluminum dibutoxyethylacetate, and organotitanium compounds selected from tetraisopropyl titanate, tetrabutyl titanate, tetra-2-ethylhexyltitanate, tetrastearyl titanate, isopropyl tristearyl titanate, tributylstearyl titanate, butyl titanate dimer, polytripropyl titanate, polybutyl titanate, polytributyl stearyl titanate, titanium acetylacetonate, titanium ethylacetoacetate, titanium octylene glycolate, dihydroxy-bix(lactate)titanium, tetraoctylene glycol titanium, dipropoxytitanium bis(lactate), polytitanium acetylacetonate, polyhydroxytitanium stearate, isopropyl tridodecylbenzenesulfonyl titanate, isopropyl tris(dioctylpyrophosphate)titanate, tetraisopropyl bis(dioctylphosphite)titanate, tetraoctyl bis(ditridecylphosphite)titanate, tetra(2,2-diallyloxymethyl-1-butyl) bis(ditridecylphosphite)titanate, bis(dioctylpyrophyosphate)oxyacetotitanate and bis(dioctylpyrophosphate)ethlene titanate.

10. The epoxy resin composition of claim 9, wherein said secondary additive is an organosilicon compound.

11. The epoxy resin composition of claim 10, wherein said alkylarylsilsesquioxane silicone compound is methylphenylpolysilsesquioxane.

12. The epoxy resin composition of claim 10, wherein said organosilicon compound is at least one organosiloxane polymer selected from compounds having the following chemical formula:

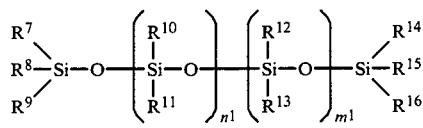

wherein $R^7$–$R^{16}$ are the same or different and eacy represents at least one of alkyl, aryl, alkenyl, aralkyl hydrogen or hydroxy, and $n^1$ and $m^1$ are independently 0 or an integer of 1 or more.

13. The epoxy resin composition of claim 12, wherein said organosiloxane polymer is at least one of polydimethylsiloxane, polymethylphenylsiloxane, polydiphenylsiloxane, polymethylhydrogensiloxane, polymethylpentylsiloxane and polymethylnonanesiloxane.

14. The epoxy resin composition of claim 10, wherein said organosilicon compound is present in an amount of about 0.1–5 parts by weight per 100 parts by weight of the epoxy resin.

15. The epoxy resin composition of claim 9, wherein said organoaluminum compound is present in an amount of about 0.01–5 parts by weight per 100 parts by weight of the epoxy resin.

16. The epoxy resin composition of claim 9, wherein said secondary additive is an organoaluminum compound.

17. The epoxy resin composition of claim 9, wherein said secondary additive is an organotitanium compound.

18. The epoxy resin composition of claim 9, wherein said organotitanium compound is present in an amount of about 0.01–5 parts by weight per 100 parts by weight of the epoxy resin.

19. The epoxy resin composition of claim 9, wherein said dithiophosphoric acid derivative is a zinc aromatic dithiophosphate and said organosilicon compound is methylphenylpolysilsequioxane.

20. The epoxy resin composition of claim 9, wherein said dithiophosphoric acid derivative is a zinc aromatic dithiophosphate and said organosilicon compound is polymethylnonanesiloxane.

21. The epoxy resin composition of claim 9, wherein said dithiophosphoric acid derivative is a zinc aromatic dithiophosphate and said organosilicon compound is polymethylphenylsiloxane.

22. The epoxy resin composition of claim 1, wherein said metal salts of dithiocarbamic acids are at least one selected from zinc dimethyldithiocarbamate, zinc diethyldithiocarbamate, zinc dipropyldithiocarbamate, zinc dibutyldithiocarbamate, zinc diamyldithiocarbamate, zinc diisoamyldithiocarbamate, zinc dioctyldithiocarbamate, zinc di-2-ethylhexyldithiocarbamate, zinc N-ethyl-N-phenyl-dithiocarbamate, zinc N-pentamethylenedithiocarbamate, copper dimethyldithiocarbamate, copper diethyldithiocarbamate, copper N-pentamethylenedithiocarbamate, lead N-pentamethylenedithiocarbamate and ferric N-pentamethylenedithiocarbamate.

23. The epoxy resin composition of claim 1, wherein said metal salt of dithiocarbamic acid is present in an amount of about 0.1–10 parts by weight per 100 parts by weight of the epoxy resin.

24. The epoxy resin composition of claim 1, further including a secondary additive comprising an alkylarylsilsesquioxane silicone compound having the following chemical formula:

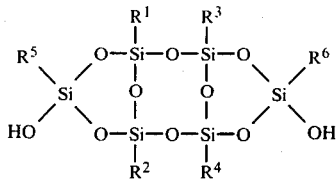

wherein $R^1$–$R^6$ are the same or different and each represents alkyl, aryl, alkenyl or aralkyl.

25. The epoxy resin composition of claim 24, wherein said alkylarylsilsesquioxane silicone compound is methylphenylpolysilsesquioxane.

26. The epoxy resin composition of claim 24, wherein said alkylarylsilsesquioxane silicone compound is present in an amount of about 0.1–5 parts by weight per 100 parts by weight of the epoxy resin.

27. The epoxy resin composition of claim 24, wherein said metal salt of dithiocarbamic acid is zinc N-methyl-N-phenyldithiocarbamate and said organosilicon compound is methylphenylsilsesquioxane.

28. The epoxy resin composition of claim 1, wherein said oxidized wax is at least one wax selected from oxidized paraffin wax, metal salts of oxidized paraffin, esterified derivatives of oxidized paraffin and oxidized natural wax.

29. The epoxy resin composition of claim 28, wherin said oxidized way is present in an amount of about 0.1–10 parts by weight per 100 parts by weight of the epoxy resin.

30. The epoxy resin composition of claim 28, further including at least one secondary additive selected from: alkylarylsilsesquioxane silicone compounds having the following chemical formula:

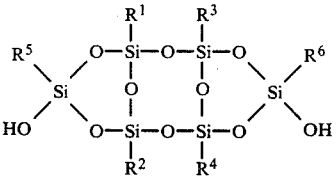

wherein $R^1$–$R^6$ are the same or different and each represents alkyl, aryl, alkenyl or aralkyl,
organoaluminum compounds selected from trialkoxyaluminum compounds, aluminum chelate compounds and aluminum coupling agents,
organotitanium compounds selected from tetraalkoxytitanium compounds, titanium acylate compounds, titanium chelate compounds and titanium coupling agents, and
organotin compounds selected from organotin stabilizer compatible with polyvinyl chloride.

31. The epoxy resin composition of claim 28, further including a secondary additive selected from:
an alkylarylsilsesquioxane silicone compound having the following chemical formula:

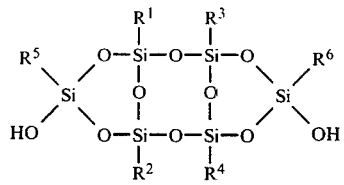

wherein $R^1$–$R^6$ are the same or different and each represents alkyl, aryl, alkenyl, or aralkyl,
an organoaluminum compound selected from aluminum isopropylate, aluminum butylate, aluminum sec-butylate, aluminum tert-butylate, aluminum diisopropylate sec-butylate, aluminum isopropylate disec-butylate, aluminum octylate, aluminum laurate, aluminum stearate, aluminum oxide isopropylate, aluminum oxide octylate, aluminum oxide stearate, aluminum oxide stearate trimer, aluminum trisethylacetoacetate, aluminum isopropoxyethylacetoacetate, aluminum dibutoxyacetoacetate and aluminum dibutoxymonoethylacetate,
an organotitanium compound selected from tetraisopropyl titanate, tetrabutyl titanate, tetra-2-ethylhexyl titanate, tetrastearyl titanate, isopropyl tristearyl titanate, tributyl stearyl titanate, butyl titanate dimer, polypropyl titanate, polybutyl titanate, polytributyl stearyl titanate, titanium acetylacetonate, titanium ethylacetoacetate, titanium octylene glycolate, dihydroxybis(lactate)titanium, tetraoctylene glycol titanium, dipropoxytitanium bis(lactate), polytitanium acetylacetonate, polyhydroxytitanium stearate, isopropyl tridodecylbenzenesulfonyl titanate, isopropyl tris(dioctylpyrophosphate)titanate, tetraisopropyl tris(dioctylpyrophosphate)titanate, tetraisoproply bis(dioctylphosphite)titanate, tetraoctyl bis(ditridecylphosphite)titanate, tetra(2,2-diallyloxymethyl-1-butyl)bis(ditridecylphosphite)titanate, bis(dioctylpyrophosphate)oxyacetotitanate and bis(dioctylpyrophosphate)ethylene titanate, and
an organotin compound selected from tetrabutyltin, dibutyltin dilauryl mercaptide, butyltin tris-dodecyl mercaptide, dimethyltin sulfide, octyltin sulfide, tributyltin laurate, tributyltin oleate, dibutyltin dilaurate, dibutyltin distearate, dibutyltin laurate maleate, dioctyltin laurate maleate, tributyltin acetate, trimethyltin maleate, tributyltin maleate, tributyltin gluconate, dibutyltin oxide, bistributyltin oxide, tetraphenyltin, tributyltin butyl phenolate, tributyltin benzoate, triphenyltin benzoate, triphenyltin terephthalate and tributyltin cinnamate.

32. The epoxy resin composition of claim 1, wherein said alkylarylsilsesquioxane silicone compound is methylphenylpolysilsesquioxane.

33. The epoxy resin composition of claim 1, wherein said alkylarylsilsesquioxane silicone compound is present in an amount of about 0.1–5 parts by weight per 100 parts by weight of the epoxy resin.

34. The epoxy resin composition of claim 31, wherein said secondary additive is an organoaluminum compound.

35. The epoxy resin composition of claim 31, wherein said secondary additive is an organotitanium compound.

36. The epoxy resin composition of claim 1, wherein said organoaluminum compound is present in an amount of about 0.01-5 parts by weight per 100 parts by weight of the epoxy resin.

37. The epoxy resin composition of claim 31, wherein said secondary additive is an organotin compound.

38. The epoxy resin composition of claim 1, wherein said organotitanium compound is present in an amount of about 0.01-5 parts by weight per 100 parts by weight of the epoxy resin.

39. The epoxy resin composition of claim 31, wherein said organotin compound is present in an amount of about 0.01-5 parts by weight per 100 parts by weight of the epoxy resin.

40. The epoxy resin composition of claim 1, wherein said epoxy resin is at least one of a glycidyl ether epoxy resin, a phenol novolak epoxy resin, a cresol novolak epoxy resin, an alicyclic epoxy resin, a glycidyl ester epoxy resin, a linear aliphatic epoxy resin and a halogenated epoxy resin.

41. The epoxy resin composition of claim 1, wherein said hardener is at least one selected from acid anhydrides, aromatic amines, aliphatic amines, alicyclic amines and prepolymers of synthetic resins.

42. The epoxy resin composition of claim 1, wherein said hardener is present in an amount so that the chemical equivalent ratio of the number of functional groups in the hardener to the number of epoxy groups in the epoxy resin is in the range of about 0.5-1.5.

43. An epoxy resin composition comprising an epoxy resin, a hardener, at least one additive for forming a rust preventing film selected from the group consisting of dithiophosphoric acids having the following chemical formula

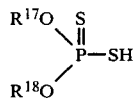

wherein $R^{17}$ and $R^{18}$ are the same or different and each represents alkyl, aryl or alkenyl having 1 to 24 carbon atoms, and at least one secondary additive for forming the rust preventing film selected from:

an organosilicon compound, selected from an alkylarylsilsesquioxane silicone compound having the chemical formula:

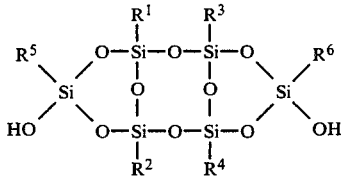

wherein $R^1$-$R^6$ are the same or different and each represents alkyl, aryl, alkenyl or aralkyl and an organosiloxane polymer, an organoaluminum compound selected from aluminum isopropylate, aluminum butylate, aluminum s-butylate, aluminum tert-butylate, aluminum diisopropylate s-butylate, aluminum isopropylate di-s-butylate, aluminum octylate, aluminum laurate, aluminum stearate, aluminum oxide isopropylate, aluminum oxide octylate, aluminum oxide stearate, aluminum oxide stearate trimer, aluminum trisethylacetoacetate, aluminum isopropoxyethylacetoacetate, aluminum dibutoxyacetoacetate and aluminum dibutoxyethylacetate, and an organotin compound selected from tetrabutyltin, dibutyltin dilauryl mercaptide, butyltin tris-dodecyl mercaptide, dimethyltin sulfide, octyltin sulfide, tributyltin laurate, tributyltin oleate, dibutyltin dilaurate, dibutyltin distearate, dibutyltin laurate maleate, dioctyltin laurate maleate, tributyltin acetate, trimethyltin maleate, tributyltin maleate, tributyltin gluconate, dibutyltin oxide, bistributyltin oxide, tetraphenyltin, tributyltin butyl phenolate, tributyltin benzoate, triphenyltin benzoate, triphenyltin terephthalate and tributyltin cinnamate.

44. An epoxy resin composition, comprising an epoxy resin, a hardener and in combination as a rust preventing film forming component:

a metal salt of dithiocarbamic acid having the following chemical formula:

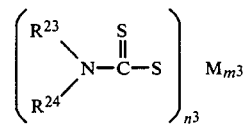

wherein $R^{23}$ and $R^{24}$ are the same or different and each represents alkyl, aryl, alkenyl or aralkyl having 1–18 carbon atoms, or $R^{23}$ and $R^{24}$ may be taken together to form a ring, M represents a metallic element selected from zinc, molybdenum, iron, nickel, copper, lead, tellurium, and $m^3$ and $n^3$ are each an integer, and an alkylarylsilsesquioxane silicone compound having the following chemical formula:

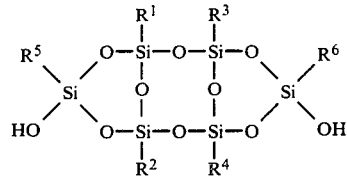

wherein $R^1$-$R^6$ are the same or different and each represents alkyl, aryl, alkenyl or aralkyl.

45. An epoxy resin composition, comprising an epoxy resin, a hardener and in combination at least one oxidized wax and at least one of:

an alkylarylsilsesquioxane silicone compound having the following chemical formula:

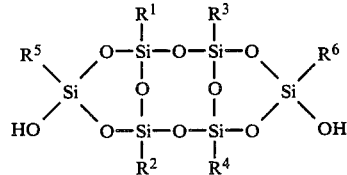

wherein $R^1$-$R^6$ are the same or different and each represents alkyl, aryl, alkenyl or aralkyl, an organoaluminum compound selected from aluminum isopropylate, aluminum butylate, aluminum sec-butylate, aluminum tert-butylate, aluminum diisopropylate sec-butylate, aluminum isopropylate disec-butylate, aluminum octylate, aluminum laurate, aluminum stearate, aluminum oxide isopropylate, aluminum oxide octylate, aluminum oxide stearate, aluminum oxide stearate trimer, aluminum trisethylacetoacetate, aluminum isopropoxyethylacetoacetate, aluminum dibutoxyacetoacetate and aluminum dibutoxymonoethylacetate, an organotitanium compound selected from tetraisopropyl titanate, tetrabutyl titanate, tetra-2-ethylhexyl titanate, tetrastearyl titanate, isopropyl tristearyl titanate, tributyl stearyl titanate, butyl titanate dimer, polypropyl titanate, polybutyl titanate, polytributyl stearyl titanate, titanium acetylacetonate, titanium ethylacetoacetate, titanium octylene glycolate, dihydroxybis(lactate)titanium, tetraoctylene glycol titanium, dipropoxytitanium bis(lactate), piolytitanium acetylacetonate, polyhydroxytitanium stearate, isopropyl tridodecylbenzenesulfonyl titanate, isopropyl tris(dioctylpyrophosphate)titanate, tetraisopropyl bis(dioctylphosphite)titanate, tetraoctyl bis(ditridecylphosphite)titanate, tetra(2,2-diallyloxymethyl-1-butyl) bis(ditridecylphosphite)titanate, bis(dioctylpyrophosphate)oxyacetotitanate and bis(dioctylpyrophosphate)ethylene titanate, and an organotin compound selected from tetrabutyltin, dibutyltin dilauryl mercaptide, butyltin tris-dodecyl mercaptide, dimethyltin sulfide, octyltin sulfide, tributyltin laurate, tributyltin oleate, dibutyltin dilaurate, dibutyltin distearate, dibutyltin laurate maleate, dioctyltin laurate maleate, tributyltin acetate, trimethyltin maleate, tributyltin maleate, tributyltin gluconate, dibutyltin oxide, bistributyltin oxide, tetraphenyltin, tributyltin butyl phenolate, tributyltin benzoate, triphenyltin benzoate, triphenyltin terephthalate and tributyltin cinnamate.

46. An epoxy resin composition comprising an epoxy resin, a hardener, at least one additive for forming a rust preventing film selected from the group consisting of dithiophosphoric acids having the following chemical formula

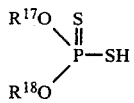

wherein $R^{17}$ and $R^{18}$ are the same or different and each represents alkyl, aryl or alkenyl having 1 to 24 carbon atoms, and at least one secondary additive for forming the rust preventing film selected from:

organosilicon compounds selected from an alkylarylsilsesquioxane silicone compound having the chemical formula:

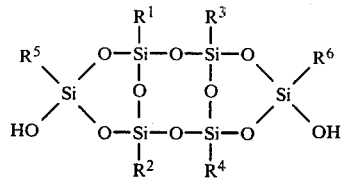

wherein $R^1$-$R^6$ are the same or different and each represents alkyl, aryl, alkenyl or aralkyl and an organosiloxane polymer, organoaluminum compounds selected from at least one of trialkoxyaluminum compounds, aluminum chelate compounds and aluminum coupling agents, and organotin compounds selected from organotin stabilizers compatible with polyvinyl chloride.

47. An epoxy resin composition, comprising an epoxy resin, a hardener and in combination at least one oxidized wax and at least one of:

alkylarylsilsesquioxane silicone compounds having the following chemical formula:

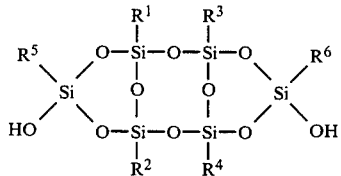

wherein $R^1$-$R^6$ are the same or different and each represents alkyl, aryl, alkenyl or aralkyl, organoaluminum compounds selected from trialkolyaluminum compounds, aluminum chelate compounds and aluminum coupling agents, organotitanium compounds selected from tetraalkoxytitanium compounds titanium acytate compounds, titanium chelate compounds and titanium coupling agents, and organotin compounds selected from organotin stabilizers compatible with polyvinyl chloride.

* * * * *